US012696832B2

(12) United States Patent
Ferrari et al.

(10) Patent No.: US 12,696,832 B2
(45) Date of Patent: Aug. 4, 2026

(54) IMPLEMENT CONTROL FOR AGRICULTURAL VEHICLES

(71) Applicant: CNH Industrial Italia S.p.A., Turin (IT)

(72) Inventors: Luca Ferrari, Modena (IT); Fabio Lisurici, Modena (IT); Andrea Rizzi, Costermano Sul Garda (IT)

(73) Assignee: CNH INDUSTRIAL ITALIA S.P.A., Turin (IT)

( * ) Notice: Subject to any disclaimer, the term of this patent is extended or adjusted under 35 U.S.C. 154(b) by 73 days.

(21) Appl. No.: 18/960,496

(22) Filed: Nov. 26, 2024

(65) Prior Publication Data

US 2025/0280749 A1 Sep. 11, 2025

(30) Foreign Application Priority Data

Nov. 27, 2023 (IT) ......................... 102023000025167

(51) Int. Cl.
| | |
|---|---|
| *A01B 69/04* | (2006.01) |
| *A01B 69/00* | (2006.01) |
| *G01S 19/48* | (2010.01) |
| *G05D 1/672* | (2024.01) |
| *G05D 107/20* | (2024.01) |
| *G05D 111/10* | (2024.01) |

(52) U.S. Cl.
CPC .......... *A01B 69/008* (2013.01); *A01B 69/001* (2013.01); *G01S 19/48* (2013.01); *G05D 1/672* (2024.01); *G05D 2107/21* (2024.01); *G05D 2111/17* (2024.01)

(58) Field of Classification Search
CPC .... A01B 69/008; A01B 69/001; G05D 1/672; G05D 2111/17; G05D 2107/21; G01S 19/48
See application file for complete search history.

(56) References Cited

U.S. PATENT DOCUMENTS

| | | | | |
|---|---|---|---|---|
| 10,151,839 B2 * | 12/2018 | McPeek | ................ | G01S 7/4865 |
| 2023/0124667 A1 * | 4/2023 | Sibley | ................ | A01M 7/0089 |
| | | | | 47/1.7 |
| 2023/0166283 A1 * | 6/2023 | Sibley | .................. | B05B 12/082 |
| | | | | 239/587.5 |

FOREIGN PATENT DOCUMENTS

| | | |
|---|---|---|
| CA | 3042593 | 11/2019 |
| CN | 212279614 | 1/2021 |

OTHER PUBLICATIONS

IT Application No. 202300025167, Search Report, dated May 9, 2024, 6 pgs.
Peng et al., "GNSS-Free End-of-Row Detection and Headland Maneuvering for Orchard Navigation Using a Depth Camera," MDPI, Jan. 9, 2023, 18 pgs.

* cited by examiner

*Primary Examiner* — Jay Khandpur

(74) *Attorney, Agent, or Firm* — Fletcher Yoder, P.C.

(57) ABSTRACT

A method for controlling an implement moved by an agricultural vehicle driving over a path along a crop row includes using a point cloud sensor to scan a portion of the crop row and to generate a point cloud. Multiple crop row volumes arranged along the portion of the crop row are determined. For each crop row volume, a vertical point density distribution is determined by determining which points of the point cloud fall within the crop row volume. The implement is controlled based on the vertical point density distribution of each crop row volume.

15 Claims, 3 Drawing Sheets

IMPLEMENT CONTROL FOR AGRICULTURAL VEHICLES

CROSS-REFERENCE TO RELATED APPLICATION

This application claims priority from and the benefit of Italian Patent Application No. 102023000025167 filed Nov. 27, 2023, which is hereby incorporated by reference in its entirety.

TECHNICAL FIELD

The present invention relates to a method of controlling an implement of an agricultural vehicle driving over a path along a crop row. The present invention further relates to a system configured to carry out such a control method, and an agricultural vehicle comprising such a system.

BACKGROUND

In recent years, big improvements in the accuracy of driver assistance systems have made it easier for operators of drive through the fields and make efficient use of the implements they may be pulling or pushing through these field. Partly or fully autonomous driving systems allow the driver to pay more attention to the operation of the implement. In some agricultural vehicles, visual camera systems are installed and image recognition algorithms are used for selective spraying of crops. In some newer systems, neural networks and AI processing of images may be used to classify, locate, and bound objects of interest. Other systems may use LIDAR for detecting the presence and location of trees and plants. This information may be combined with GPS information to selectively spray regions that need spraying.

It is an aim of the present invention to further improve on the systems already disclosed in the prior art.

SUMMARY OF THE INVENTION

According to an aspect of the invention there is provided a method of controlling an implement of an agricultural vehicle driving over a path along a crop row. The method comprises a step of using a point cloud sensor to scan a portion of the crop row and to generate a point cloud. A plurality of crop row volumes is defined. The crop row volumes are arranged along the scanned portion of the crop row. For each of the crop row volumes, a vertical point density distribution is determined by calculating which points of the point cloud fall within said crop row volume. The implement is then controlled based on the vertical point density distribution of each of the crop row volumes.

While LIDAR may have been used before to detect the presence or absence of plants and trees, the current invention takes the use of point cloud data for implement control to another level. By determining the vertical point density in each crop row volume it is made possible to control the implement in a way that optimises the efficient use of, for example, vehicle power and spraying liquid. Instead of a one-size-fits-all approach, the now proposed control method allows for adapting the implement use to the local crop growth. For example, more spraying liquid may be used where the vegetation is more dense and more spraying liquid may be needed. In orchards, tree tops may be treated according to the local density of their foliage, without wasting energy or spraying liquid on less dense parts of the vegetation. When tilling cover crops, energy may be saved by tilling less aggressively where the crop is lower and less dense.

In some embodiments, the LIDAR-based system may supplement a GPS-based implement control system for enhanced accuracy. The GPS-based system may, for example, make use of detailed georeferenced field maps that may have been provided by satellite imaging systems, drone observations, or previous passes of agricultural vehicles through the field. Alternatively, the LIDAR-based system is provided as a backup system for when the GPS-based implement control system fails, for example because of unreliable GPS signals.

In a particular implementation, each of the crop row volumes comprises two or more crop row sub-volumes, each crop row sub-volume of the crop row volume being arranged at a different height above ground, and wherein the vertical point density distribution of the crop row volume is determined by calculating which points of the point cloud fall within each one of the crop row sub-volumes. The smaller the sub-volumes, the more precise the vertical point density distribution may be, and the more efficient the implement operation can be made.

The method of controlling an implement may further comprise determining a point cloud envelope of the point cloud and controlling the implement based on the point cloud envelope. The point cloud envelope may be calculated using edge detection algorithms to determine the boundaries of the point clouds generated by the point cloud sensor. Alternatively, the point cloud envelope is determined based on the vertical point density distribution of each of the crop row volumes.

Typically, the scanned portion of the crop row is at least partly located ahead of the implement during the scanning of said portion. The scanned portion of the crop row may be located ahead of the agricultural vehicle while the implement is located behind the agricultural vehicle.

Typically, GPS sensors and algorithms based on GPS data are used to accurately control the timing of the use of the implement. Unfortunately, in some locations, such as inside greenhouses or in orchards with dense foliage and canopy, GPS signals may be weak and GPS-based positioning systems may not have the desired accuracy. To solve this problem, preferred embodiments of the method according to the invention further comprise a step of determining a travel speed of the agricultural vehicle and the controlling of the implement is further based on the travel speed of the agricultural vehicle. By taking into account the vehicle's travel speed, which can be done without the use of GPS, the implement's exact position relative to the observed point cloud can be determined and the timing of the use of the implement can be optimised. Travel speeds of the agricultural vehicle may, for example, be measured using odometry in the form of rotary encoders, accelerometers or camera image based motion analysis.

In preferred embodiments, the plurality of crop row volumes may comprise a closer row of crop volumes, arranged along the scanned portion of the crop row at a first distance to the path, and a further row of crop volumes, arranged along the scanned portion of the crop row at a second distance to the path, the second distance being larger than the first distance. By also scanning the crop rows in this horizontal direction perpendicular to the travel path of the agricultural vehicle, and in addition to the calculation of a vertical point density distribution, a full 3D picture of the varying point density in the crop row can be obtained and the operation of the implement can be adapted accordingly.

Optionally, a method according to the invention further includes a step of, based on the vertical point density distribution of the crop row volumes, detecting an end of the crop row, and a step of initiating a headland turn sequence comprising controlling the implement to prepare for an upcoming headland turn. This way, the point cloud sensor can be used, not just for improved implement control, but also for end of row detection. This method for end of row detection brings the advantage that it remains available in the absence of an accurate GPS signal. To further improve the end of row detection, the control system may look for crop row volumes with no or very few points of the generated point cloud at either side of the agricultural vehicle.

In a particular advantageous implementation, the implement of the agricultural vehicle is a sprayer with a plurality of spraying nozzles, and controlling the implement comprises selectively opening and closing a subset of the plurality of spraying nozzles. With such a selectively controllable sprayer, it is possible to only spray the parts of crops that need to be sprayed. It may further be possible to selectively spray specific amounts of spraying liquid in dependence of the local point density at the respective height, such that more spraying liquid is applied to the most dense parts of the crop.

The method according to the invention may further comprise the use of the point cloud sensor to scan a portion of a second crop row along another side of the path. In this case, a plurality of second crop row volumes is defined, the second crop row volumes also being arranged along the scanned portion of the second crop row. For each of the second crop row volumes, a vertical point density distribution is determined by calculating which points of the point cloud fall within said crop row volume, and the implement is controlled based on the vertical point density distribution of each of the second crop row volumes. As already described above, point could data from both sides of the path may be combined to determine when the agricultural vehicle and the implement reach the end of a crop row.

According to another aspect of the invention, a non-transitory, computer-readable storage medium is provided, storing instructions thereon that when executed by one or more processors cause the one or more processors to execute a method as described above.

According to yet another aspect of the invention, a system is provided for controlling an implement of an agricultural vehicle driving over a path along a crop row. The system comprises a point cloud sensor configured to scan a portion of the crop row and to generate a point cloud. The point cloud sensor may, for example, be a LIDAR sensor, a stereo-camera, or a radar (e.g. Imaging or 4D radar). A controller of the system is operatively coupled to the point cloud sensor to receive the generated point cloud therefrom. The controller is configured to use the system to perform a method as described above.

Preferably, the system further comprises a speed sensor for determining a travel speed of the agricultural vehicle. The speed sensor is operatively coupled to the controller, which is further configured to generate the control commands based on the vertical point density distribution of each of the crop row volumes and the travel speed of the agricultural vehicle. As described above, this allows the system to operate with the desired accuracy, even in situations where no reliable GPS information may be available.

According to another aspect of the invention, an agricultural vehicle is provided. The agricultural vehicle is configured to carry and control an implement, and it comprises a control system as described above.

BRIEF DESCRIPTION OF THE DRAWINGS

Embodiments of the invention will now be described by way of example with reference to the accompanying drawings, in which.

DETAILED DESCRIPTION

Figure 1:
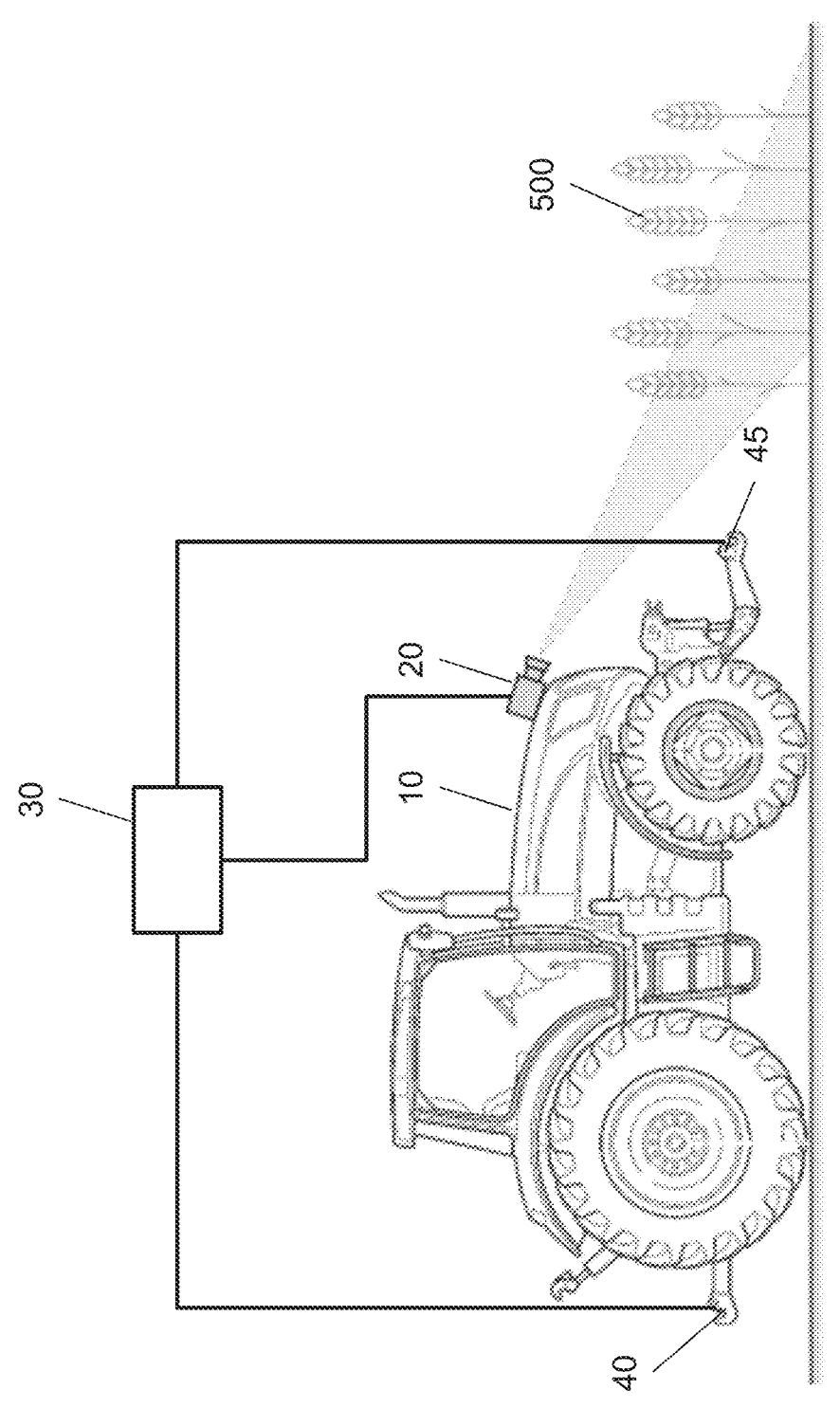
FIG. 1 shows a tractor that may make use of the current invention.

FIG. 1 shows an agricultural vehicle in the form of a tractor 10 that may make use of the current invention. A point cloud sensor 20 is installed on the hood of the tractor 10 to scan a portion of the crop 500 the tractor 10 drives by during use. The point cloud sensor 20 may, for example, be a LIDAR sensor, a digital camera, a stereo camera, etc. The point cloud sensor 20 is configured to generate a point cloud. Point clouds comprise a plurality of points with a defined position in space and thereby represent the 3D shape of an object or part of an object. The point cloud data is generally obtained by determining a distance and direction between the point cloud sensor 20 and a plurality of points on the surface of the object. The point cloud sensor 20 in this example is installed at the hood of the tractor 10 and has a field of view that is positioned in front of the tractor 10 in the direction of travel. The point cloud sensor 20 of FIG. 1 may be supplemented with, or replaced by, other point cloud sensors 20 looking more to the side and/or rear of the tractor 10. Other suitable locations for installing the point cloud sensor 20 may, for example, include positions on or at the roof of the driver cabin or at the mount of the side mirrors. A rotatable or otherwise movable point cloud sensor 20 may be used to obtain a full 360° view of the direct environment of the tractor 10.

Figure 2:
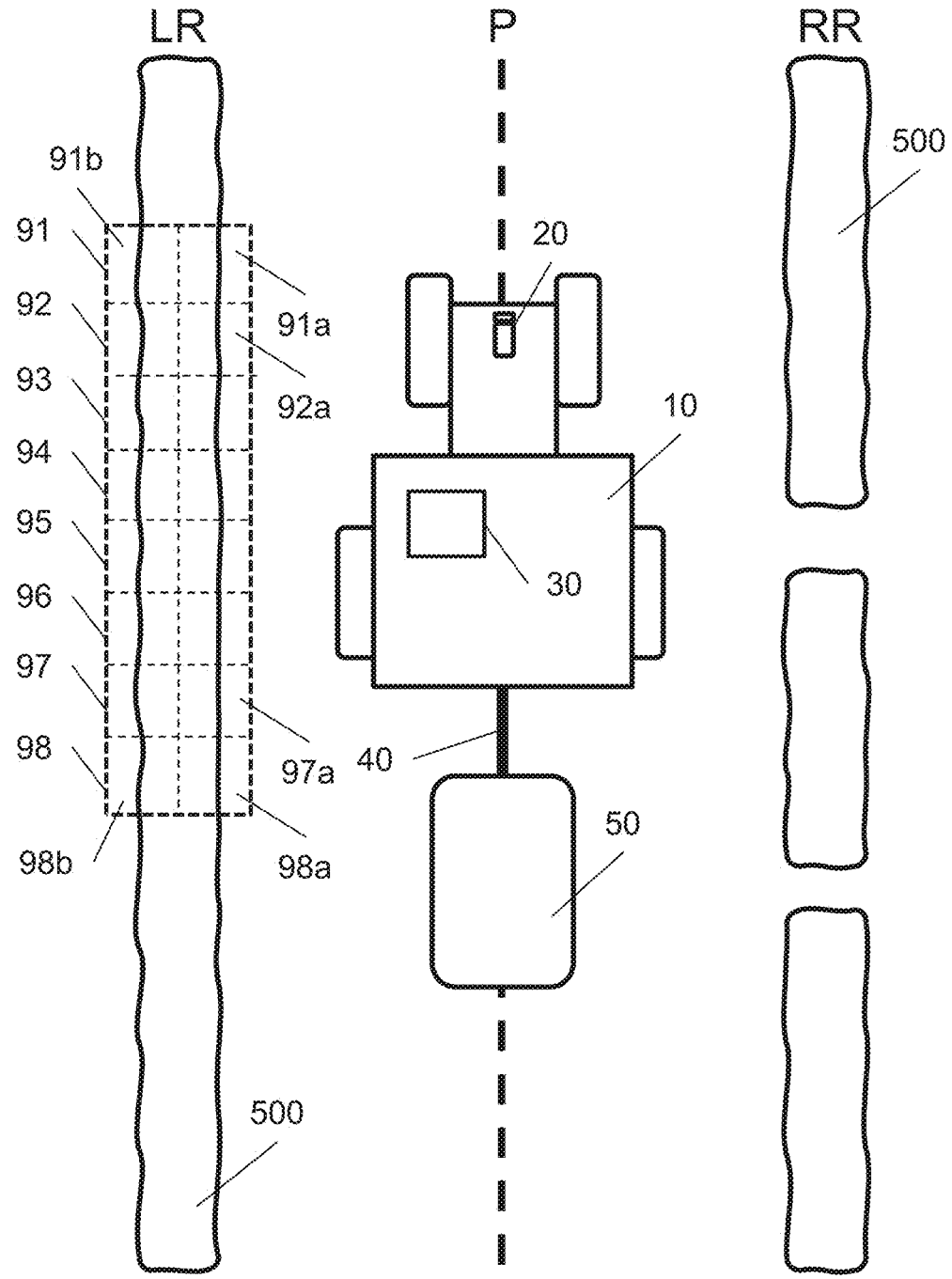
FIG. 2 schematically shows the tractor of FIG. 1, towing an implement and driving between two crop rows.

The tractor 10 comprises a towbar, for example in the form of a three-point hitch 40, for towing an implement 50 (see FIG. 2). The implement 50 may be powered by the tractor engine via a PTO. In other embodiments, an implement may be carried at the tractor's front hitch 45. The point cloud sensor 20 is coupled to a controller 30 of the tractor 10 via a wired or wireless connection to receive the obtained point cloud data therefrom. Similarly, the controller 30 configured to be coupled to the implement 50, for example via a wired connection through the hitch 40, 45, or via a wireless connection. According to various embodiments of the method according the invention, the controller 30 uses the received point cloud data to efficiently control the implement 50. Some essential and optional aspects of such methods are described below with reference to FIG. 2.

FIG. 2 schematically shows the tractor 10 of FIG. 1, towing an implement 50 and driving over a path P between a left crop row LR and a right crop row RR. The path P may be chosen and followed by a driver steering the tractor 10 or an autonomous driving system may control the tractor 10 to follow this path P. Alternatively, the driver may steer the tractor 10 while being guided and/or assisted by a driver assistance system. The autonomous driving system or driver assistance system may, for example, use a GPS sensor to monitor the position of the tractor and adapt its course accordingly. Alternatively or additionally, the point cloud data may be used to for determining a distance between the tractor and the two crop rows LR, RR, while controlling the tractor 10 to keep both crop rows LR, RR at substantially the same distance.

According to an embodiment of the invention, the point cloud sensor 20 is used to scan a portion of one or both crop rows LR, RR and to generate a point cloud representing the outer surface of the vegetation 500 in the respective crop row LR, RR. Depending on the crop type, the rows will contain some crop along substantially the full length of the crop row LR, RR, or gaps in between separate plants, trees, or bushes may contain no vegetation at all. The generated point cloud data is received by the controller 30. The controller defines a plurality of crop row volumes 91-98 that are arranged along the scanned portion of the crop row LR, RR. For each of the crop row volumes 91-98, a vertical point density distribution is determined by calculating which points of the generated point cloud fall within said crop row volume. The implement 50 is then controlled based on the vertical point density distribution of each of the crop row volumes 91-98.

Various methods are available for determining the vertical point density distribution of the crop row volumes 91-98. For example, each point in the generated point cloud may comprise a height parameter, indicating a vertical height of the point above a reference level (e.g. the ground level, or a height of the point cloud sensor 20). Based on the height parameters of all the points inside a crop row volume 91-98, a vertical point distribution can be computed using well-known mathematical algorithms. In a particular implementation, each of the crop row volumes 91-98 comprises two or more crop row sub-volumes. Each crop row sub-volume of the crop row volume 91-98 is arranged at a different height above ground. The vertical point density distribution of the crop row volume 91-98 is then determined by calculating which points of the point cloud fall within each one of the crop row sub-volumes. The smaller the sub-volumes, the more precise the vertical point density distribution will be, and the more efficient the implement operation can be made.

While LIDAR may have been used before to detect the presence or absence of plants and trees, the current invention takes the use of point cloud data for implement control to another level. By determining the vertical point density in each crop row volume it is made possible to control the implement 50 in a way that optimises the efficient use of, for example, vehicle power and spraying liquid. Instead of a one-size-fits-all approach, the now proposed control method allows for adapting the implement use to the local crop growth. For example, more spraying liquid may be used where the vegetation 500 is more dense and more spraying liquid may be needed. In orchards, tree tops may be treated according to the local density of their foliage, without wasting energy or spraying liquid on less dense parts of the vegetation 500. When tilling cover crops, energy may be saved by tilling less aggressively where the crop is lower and less dense.

The controller 30 may further be used for determining a point cloud envelope of the point cloud and for controlling the implement 50 based on the point cloud envelope. A point cloud envelope may be calculated using edge detection algorithms to determine the boundaries of the point clouds generated by the point cloud sensor 20. Alternatively, the point cloud envelope is determined based on the vertical point density distribution of each of the crop row volumes 91-98.

Typically, the scanned portion of the crop row LR, RR is at least partly located ahead of the implement 55 during the scanning of said portion. For example, in the embodiment of FIGS. 1 and 2, the scanned portion of the crop row LR, MR is located ahead of the tractor 10 while the implement 50 is located behind the tractor 50. Consequently, the implement control should normally not directly follow the point cloud data gathering. Typically, GPS sensors and algorithms based on GPS data are used to accurately control the timing of the use of the implement 50. Unfortunately, in some locations, such as inside greenhouses or in orchards with dense foliage, GPS signals may be weak and GPS-based positioning systems may not have the desired accuracy. To solve this problem, in preferred embodiments of the invention the controller 30 is further configured to determine a travel speed of the tractor 10 and the implement control is further based on the thus determined travel speed. By taking into account the vehicle's travel speed, the implement's exact position relative to the observed point cloud can be determined and the timing of the use of the implement 50 can be optimised. Travel speeds of the tractor 10, and the distance travelled since scanning a particular portion of the crop row LR, RR, may be measured using GPS. It may, however, be preferred to determine the travel speed in such a way that it remains accurate when no reliable GPS signal is available. For example, odometry in the form of rotary encoders, accelerometers or camera image based motion analysis may be used for accurate GPS-independent travel speed measurement. In some embodiments, the odometry system may supplement the GPS-based system for increased accuracy. In other embodiments, the odometry system is only activated when it is detected that the GPS signal is not sufficiently reliable.

In preferred embodiments, the plurality of crop row volumes 91-98 may comprise a closer row of crop volumes 91a-98a, arranged along the scanned portion of the crop row LR, RR at a first distance to the path P, and a further row of crop volumes 91b-98b, arranged along the scanned portion of the crop row LR, RR at a second distance to the path P. The second distance is larger than the first distance. For not obscuring FIG. 2 with too many labels, only some of the closer row of crop row volumes 91a-98a and further row of crop volumes 91b-98b have been labelled. By not just scanning the crop rows LR, RR in the vertical direction and in the direction of travel, but also in the horizontal direction perpendicular to the travel path P, a full 3D picture of the varying point density in all directions can be obtained and the operation of the implement can 50 be adapted accordingly.

Figure 3:
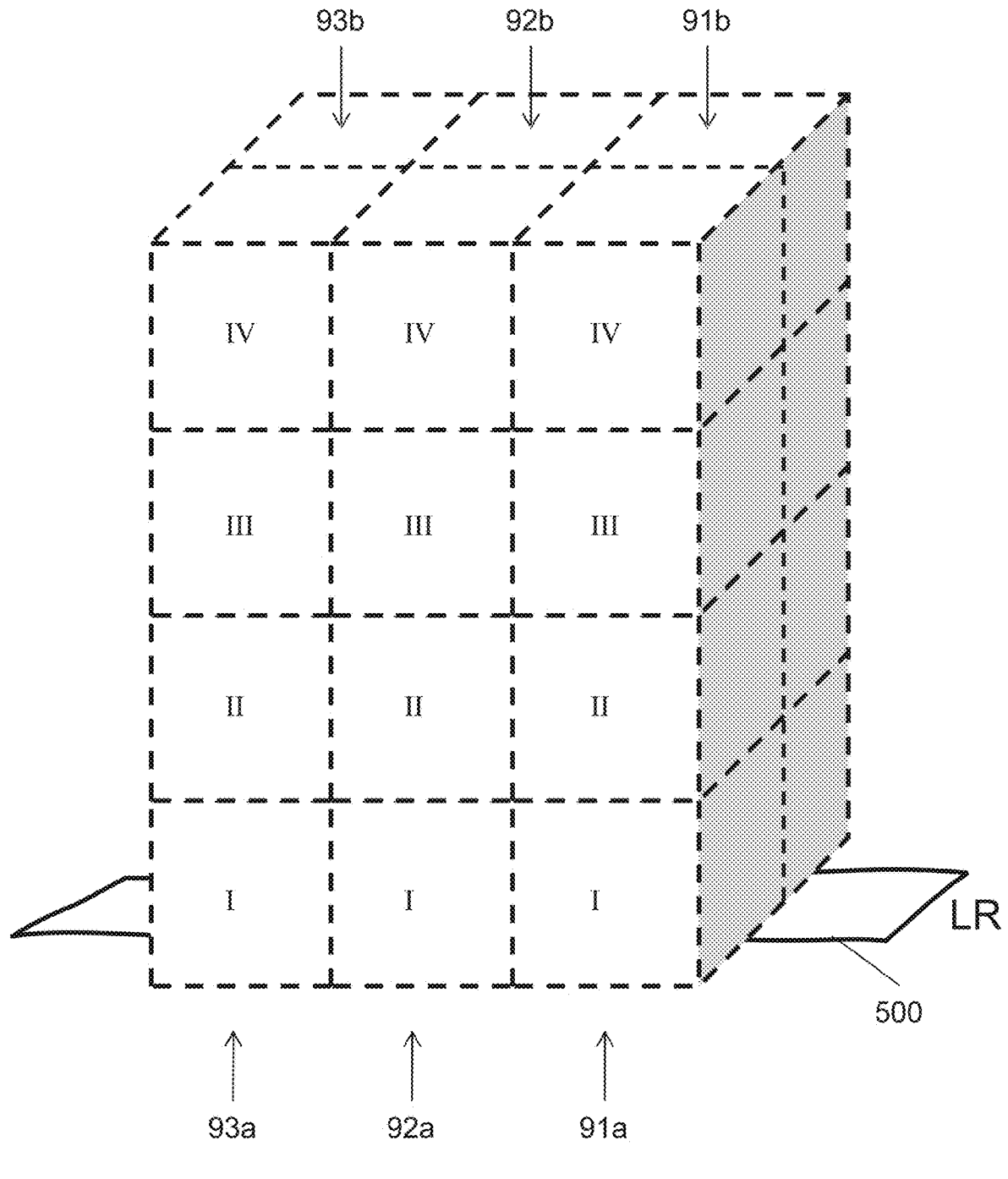
FIG. 3 schematically shows a collection of crop row volumes as defined in accordance with an embodiment of the invention.

FIG. 3 schematically shows a collection of crop row volumes 91, 92, 93 as defined in accordance with an embodiment of the invention. The crop row volumes 91, 92, 93 cover respective portions of the left crop row LR shown in FIG. 2. Each crop row volume comprises a closer row of crop volumes 91a, 92a, 93a that is positioned closer to the path P than a further row of crop volumes 91b, 92b, 93b. Each closer and further crop row volume 91a, 92a, 93a, 91b, 92b, 93b is divided into four crop row sub-volumes I, II, III, IV. Each crop row sub-volume I, II, III, IV is arranged at a different height above ground. The vertical point density distribution of the crop row volumes 91a-93b is determined by calculating which points of the point cloud fall within each one of the crop row sub-volumes I, II, III, IV.

The calculated vertical point density distribution of the crop row volumes 91-98 may be used by the controller 30 to detect an end of the crop row LR, RR. The end of a crop row may, for example, be detected when the average or maximum point density of a crop row volume 91-98 remains below a minimum threshold for a set amount of adjacent crop row volumes 91-98. Preferably, crop rows LR, RR at both sides of the tractor are monitored and a row end is only detected when no crop 500 is found at either side of the tractor 10. When a row end is detected, the controller 30 may initiate a headland turn sequence that comprises controlling the implement 50 to prepare for the upcoming turn of the tractor 10 at the headland. This way, the point cloud sensor 20 can be used, not just for improved implement control, but also for end of row detection. This method for end of row detection brings the advantage that it remains available in the absence of an accurate GPS signal.

In a particular advantageous implementation, the implement 50 of the tractor 10 is a sprayer with a plurality of spraying nozzles. The controller 30 may be configured to control the sprayer by selectively opening and closing a subset of the plurality of spraying nozzles. With such a selectively controllable sprayer, it is possible to only spray the parts of crops 500 that need to be sprayed and not waste any spraying liquid that just evaporates in the air or falls to the ground. It may further be possible to selectively spray specific amounts of spraying liquid in dependence of the local point density at the respective height, such that more spraying liquid is applied to the most dense parts of the crop. In other embodiments, the implement 50 may, for example, be a duster with multiple nozzles that can be controlled individually. Similarly, the calculated vertical point density distribution may be used to selectively control a trimmer or defoliator to operate on specific parts of trees, plants, or bushes.

The invention claimed is:

1. A method of controlling an implement moved by an agricultural vehicle driving over a path along a crop row, the method comprising:

using a point cloud sensor to scan a portion of the crop row and to generate a point cloud;

defining a plurality of crop row volumes arranged along the portion of the crop row;

for each crop row volume of the plurality of crop row volumes, determining a vertical point density distribution by determining which points of the point cloud fall within the crop row volume; and controlling the implement based on the vertical point density distribution of each of the plurality of crop row volumes;

wherein each crop row volume of the plurality of crop row volumes comprises two or more crop row sub-volumes, the two or more crop row sub-volumes of the crop row volume are arranged at different heights above ground, and the vertical point density distribution of the crop row volume is determined by determining which points of the point cloud fall within each one of the two or more crop row sub-volumes of the crop row volume.

2. The method of controlling the implement as claimed in claim 1, comprising:

determining a point cloud envelope of the point cloud; and controlling the implement based on the point cloud envelope.

3. The method of controlling the implement as claimed in claim 2, wherein the point cloud envelope is determined based on the vertical point density distribution of each of the plurality of crop row volumes.

4. The method of controlling the implement as claimed in claim 1, wherein the portion of the crop row is at least partly located ahead of the implement during the scanning of the portion.

5. The method of controlling the implement as claimed in claim 1, comprising determining a travel speed of the agricultural vehicle, wherein controlling the implement is based on the travel speed of the agricultural vehicle.

6. The method of controlling the implement as claimed in claim 1, wherein the plurality of crop row volumes comprises a closer row of crop volumes arranged along the portion of the crop row at a first distance to the path, and a farther row of crop volumes arranged along the portion of the crop row at a second distance to the path; and wherein the second distance is larger than the first distance.

7. The method of controlling the implement as claimed in claim 1, further comprising:

based on the vertical point density distribution of each of the plurality of crop row volumes, detecting an end of the crop row; and initiating a headland turn sequence comprising controlling the implement to prepare for an upcoming headland turn.

8. The method of controlling the implement as claimed in claim 1, wherein the implement is a sprayer with a plurality of spraying nozzles, and controlling the implement comprises selectively opening and closing a subset of the plurality of spraying nozzles.

9. The method of controlling the implement as claimed in claim 1, further comprising:

using the point cloud sensor to scan a portion of a second crop row along a side of the path;

defining a plurality of second crop row volumes arranged along the portion of the second crop row;

for each crop row volume of the plurality of second crop row volumes, determining a second vertical point density distribution by determining which points of the point cloud fall within the crop row volume; and controlling the implement based on the second vertical point density distribution of each of the plurality of second crop row volumes.

10. A non-transitory, computer-readable storage medium storing instructions thereon that when executed by one or more processors cause the one or more processors to execute the method of claim 1.

11. A system for controlling an implement moved by an agricultural vehicle driving over a path along a crop row, the system comprising:

a point cloud sensor configured to scan a portion of the crop row and to generate a point cloud; and a controller operatively coupled to the point cloud sensor to receive the point cloud, the controller being configured to:

define a plurality of crop row volumes arranged along the portion of the crop row;

determine a vertical point density distribution for each crop row volume of the plurality of crop row volumes by determining which points of the point cloud fall within the crop row volume; and control the implement based on the vertical point density distribution of each of the plurality of crop row volumes;

wherein each crop row volume of the plurality of crop row volumes comprises two or more crop row sub-volumes, the two or more crop row sub-volumes of the crop row volume are arranged at different heights above ground, and the vertical point density distribution of the crop row volume is determined by determining which points of the point cloud fall within each one of the two or more crop row sub-volumes of the crop row volume.

12. The system as claimed in claim 11, wherein the point cloud sensor is a LIDAR sensor.

13. The system as claimed in claim 11, comprising a speed sensor for determining a travel speed of the agricultural vehicle, wherein the speed sensor is operatively coupled to the controller, and the controller is configured to control the implement based on the vertical point density distribution of each of the plurality of crop row volumes and the travel speed of the agricultural vehicle.

14. The agricultural vehicle configured to move and control the implement, the agricultural vehicle comprising the system as claimed in claim 11.

15. The method of controlling the implement as claimed in claim 4, wherein the implement is located behind the agricultural vehicle.

* * * * *